INVENTOR.
HARLAN K. HOLMES

INVENTOR.
HARLAN K. HOLMES

United States Patent Office 3,546,552
Patented Dec. 8, 1970

3,546,552
VELOCITY LIMITING SAFETY SYSTEM
Harlan K. Holmes, Newport News, Va., assignor to the United States of America as represented by the Administrator of the National Aeronautics and Space Administration
Filed July 8, 1969, Ser. No. 839,935
Int. Cl. H02p 5/00
U.S. Cl. 318—265                                7 Claims

ABSTRACT OF THE DISCLOSURE

A safety system that limits the velocity of a vehicle that is moved by a motor. The limiting velocity is determined by the position of the moving vehicle. The motor in addition to being connected to the vehicle is coupled to a generator and to the slider of a potentiometer. The generator and the potentiometer are connected in an electrical circuit with two switching diodes and a meter relay such that the current through the coil of the meter is dependent on both the position and velocity of the vehicle. Whenever the current through the coil exceeds a predetermined value, a switch is actuated causing the power to the motor to be cut off.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to a velocity limiting safety system and more specifically concerns a safety system that limits the velocity of a vehicle with the limiting velocity being determined by the position of the vehicle.

A research vehicle with a standup pilot's compartment is used to study the handling qualities of lunar landing vehicles by the National Aeronautics and Space Administration's Langley Research Center, Hampton, Va. The Lunar Landing Research Facility, 250 feet high and 400 feet long, provides a controlled laboratory in which NASA scientists work with research pilots to explore and develop techniques for landing the Apollo Lunar Module on the moon's surface. The vehicle is operated within the confines of the overhead structure which provides travel of 360 feet down range, 50 feet cross range, and 180 feet vertically. The travel of the vehicle in six directions is controlled by three reversible motors. For safety purposes, it is necessary that when the velocity of the vehicle exceeds a predetermined value in either of the six directions the associated motor is cut off. The limiting velocity of the vehicle changes with the position of the position of the vehicle. That is, when the vehicle is close to the end of its possible travel in a direction the limiting velocity must be less than the limiting velocity when the vehicle is not close to the end of its possible travel. It is therefore the primary purpose of this invention to provide an improved system which senses instantaneous velocity and position of the vehicle and automatically initiates shutdown action should preset conditions in a function of the two variables be exceeded.

Prior systems for performing similar functions consists mainly of limit switches to sense the absolute position limit or time delay through a series of limit switches to sense velocity as a function of position over some time period. The disadvantages of the prior system are: they are not continuous or instantaneous in their operation, they are not bi-directional without duplication of the system and they are complicated to set up and maintain.

SUMMARY OF THE INVENTION

In this invention a reversible motor that moves the vehicle along a particular axis has its shaft coupled to a D.C. tachometer generator and to the slider of a potentiometer. The tachometer generates a voltage indicative of the magnitude and direction of the velocity of the vehicle and the position of the slider of the potentiometer is indicative of the position of the vehicle. The tachometer and the potentiometer are connected in a circuit with a meter relay such that the current through the meer coil is a function of both position and velocity. Whenever this current exceeds some predetermined value the meter relay is actuated thereby initiating shutdown action. Zener diodes are used to initiate shutdown action when the velocity exceeds a predetermined value regardless of position. If the vehicle is controlled in six directions three embodiments of the invention are required.

DESCRIPTION OF THE PREFERRED EMBODIMENT

Figure 1:
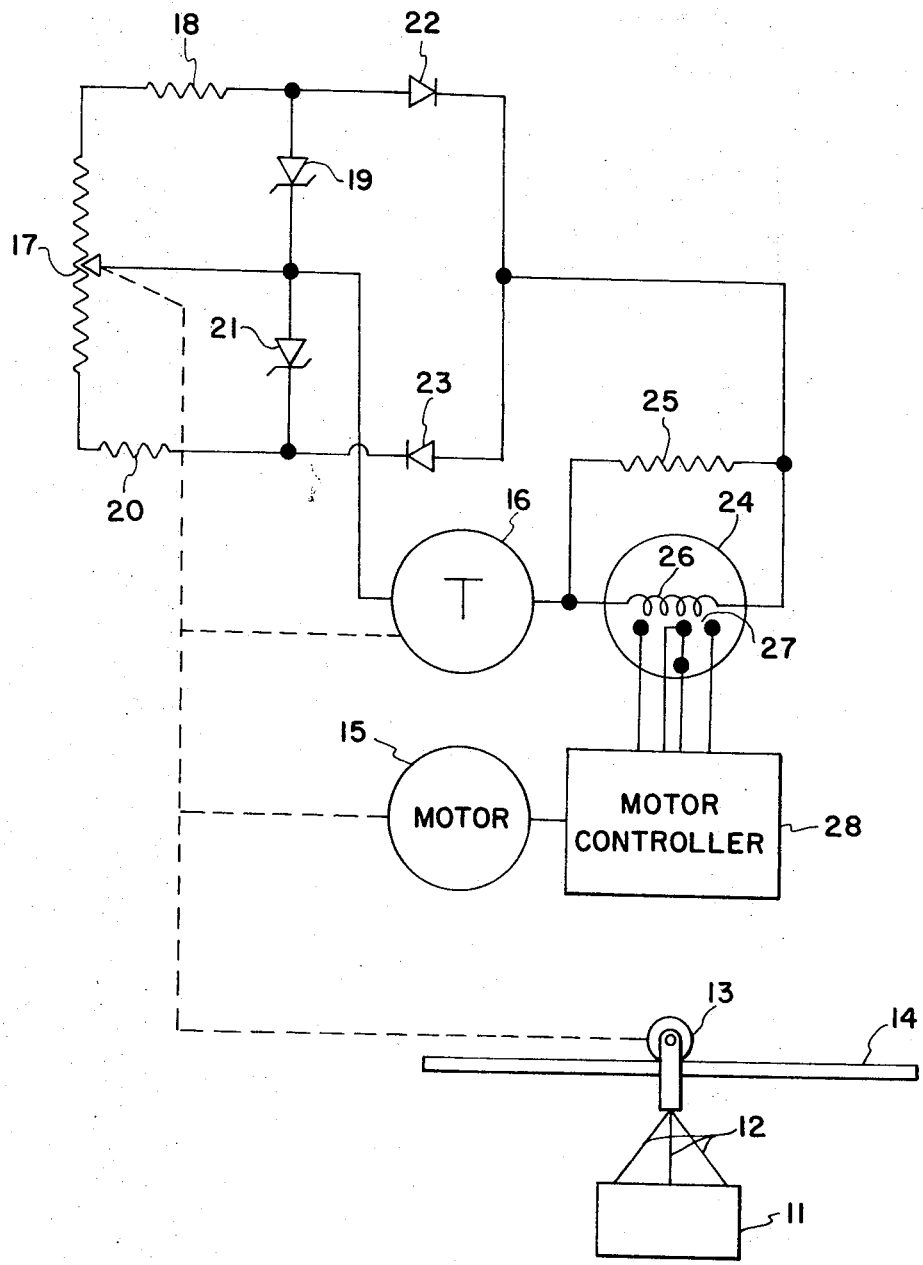
FIG. 1 is a schematic drawing of the preferred embodiment of the invention.

The number 11 in FIG. 1 designates the vehicle whose velocity is to be limited. Vehicle 11 is supported by cables 12 from a wheel 13 which is free to move on a rail 14. A motor 15 is coupled to wheel 13 to move it back and forth on rail 14. Motor 15 is also coupled to a D.C. tachometer generator 16 and to the slider of a potentiometer 17. Tachometer 16 produces a voltage proportional to the velocity of wheel 13. When wheel 14 moves to the right long rail 14, the left terminal of tachometer 16 is positive and the slider of potentiometer 17 moves upward. When wheel 13 moves to the left along rail 14 the left terminal of tachometer 16 is negative and the slider of potentiometer 17 moves downward. The upper end of potentiometer 17 is connected through a resistor 18 and a Zener diode 19 to the slider of the potentiometer, and the lower end of the potentiometer is connected through a resistor 20 and a Zener diode 21 to the slider of the potentiometer. The junction of resistor 18 and Zener diode 19 is connected through high speed switching diodes 22 and 23 to the junction of resistor 20 and Zener diode 21. The slider of potentiometer 17 is also connected through tachometer 16 and a meter coil 26 of a meter relay 24 to the junction of diodes 22 and 23. A meter shunting resistor 25 is provided for the scaling of meter 24. When the current flow through coil 26 of meter relay 24, in one direction, exceeds a predetermined value relay contacts 27 close one way and when the current flow through coil 26, in the other direction, exceeds said predetermined value relay contacts 27 close the other way. A motor controller 28 senses when contacts 27 close and disconnects the power supply to motor 15 to cut it off. Once activated, a manual reset capability can be provided as an option. Power controller 28 could merely be the contacts as shown connected between the motor and the power for the motor in which events the contacts as shown would connect the power the motor and when the contacts are actuated the power would be disconnected from the motor. Motor controller 28 could also be something more elaborate and could be utilized to apply brakes to wheel 13.

Figure 2:
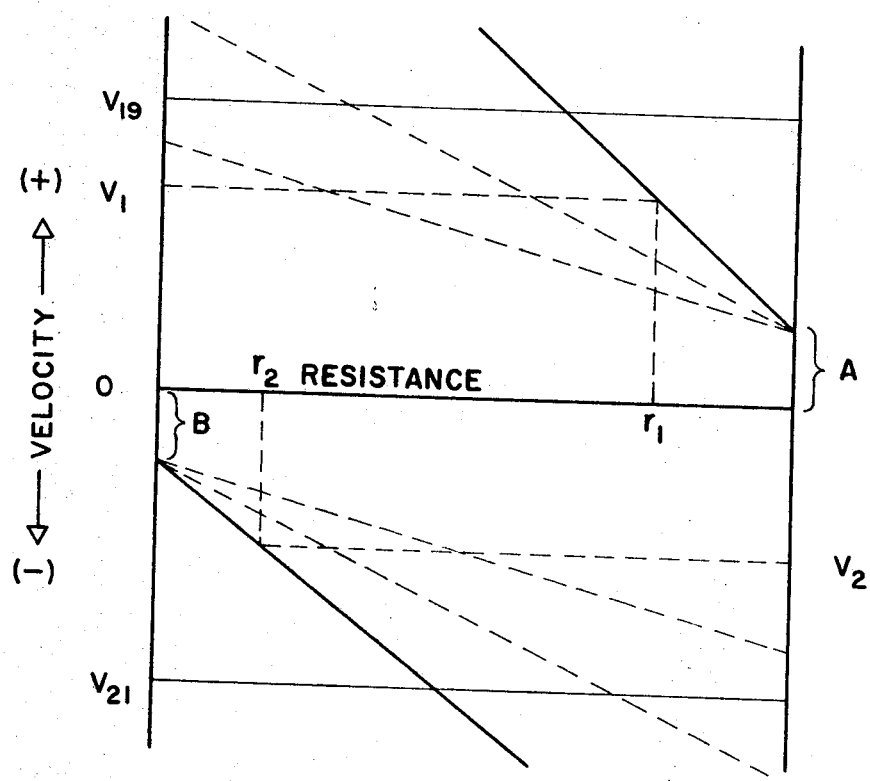
FIG. 2 is a graph of velocity versus position for the purpose of describing the operation of the preferred embodiment of the invention.

In describing the operation of the invention the graph in FIG. 2 will be referred to. In this graph velocity is proportional to the voltage generated across tachometer 16. If the left terminal of tachometer 16 is positive (wheel 13 is moving to the right along rail 14) the velocity shown on the graph is positive and if the the left terminal of tachometer 16 is negative the velocity is negative. The horizontal line $V_{19}$ is the positive velocity corresponding to the breakdown voltage of Zener diode 19 and the horizontal line $V_{21}$ is the negative velocity corresponding to the breakdown voltage of Zener diode 21. "Resistance" in this graph is the resistance of the lower portion of potentiometer 17. Hence, "resistance" is a function of the position of the slider of potentiometer 17. The graph in FIG. 2 shows three different curves. The only parameter that differs in these three curves is the value of shunt resistor 25. Hence, the slope of the curves is dependent on the value of resistor 25. The distance A is dependent on the value of resistor 18 and the distance B is dependent on the value of resistor 20. When the velocity of vehicle 11 is less than A or B the motor is not cut off regardless of the position of vehicle 11.

In the operation of this invention, assume that wheel 13 is moving to the right along rail 14 and assume that wheel 13 accelerates to a velocity $V_{19}$. Then Zener diode 19 will break down and a surge of current through coil 26 will activate contacts 27. This will happen regardless of the position of the slider of potentiometer 17 since when diode 19 breaks down potentiometer 17 and resistor 18 are bypassed and the voltage across tachometer 16 that exceeds $V_{19}$ is applied across diode 22 and meter 24. Likewise if wheel 13 is moving to the left along rail 14 and accelerates to a velocity $V_{21}$, Zener diode 21 breaks down and the resulting current surge through coil 26 activates contacts 27.

Now assume that wheel 13 is moving to the right along rail 14 at a velocity $V_1$ less than $V_{19}$ and assume that resistor 25 has a value such that the solid curve is valid. When the slider of the potentiometer moves along until the lower portion of the potentiometer has a resistance $r_1$ (upper portion has a resistance $R-r_1$ where R is the total resistance of potentiometer 17) there is adequate current through coil 26 to actuate contacts 27. That is, with tachometer 16 across the upper portion of potentiometer 17, resistor 18, diode 22 and meter coil 26, and with the slider at position $r_1$, there is adequate current through coil 26 to actuate contacts 27. Assume that wheel 13 is moving to the left along rail 14 at a negative velocity $V_2$ less than $V_{21}$. When the slider of the potentiometer moves along until the lower portion of the potentiometer has a resistance $r_2$ there is adequate current through coil 26 to activate contacts 27. That is with tachometer 16 across the lower portion of potentiometer 17, resistor 20, diode 23 and meter coil 26, and with the slider in position $r_2$, there is adequate current through coil 26 to actuate contacts 27. Whenever contacts 27 are actuated, motor controller 28 cuts off the power to motor 15 to stop it. Hence, as can be seen the point at which motor 15 is cut off while wheel 13 is traveling along rail 14 in either direction is dependent on both the velocity and position of wheel 13.

The advantages of this invention are numerous. It is simple and requires only a minimum number of components, it requires no power other than the signal; it is essentially passive in nature and therefore highly reliable; and it is continuously sensing.

It is to be understood that the form of the invention herewith shown and described is to be taken as a preferred embodiment. Various changes may be made in the arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. Many other types of relays could be substituted for meter relay 24. Motor controller 28 in addition to cutting off motor 15 could also control a braking system for wheel 13. If this invention is used for the vertical direction motor 15 would control a pulley instead of wheel 13 and only the lower or upper portion of the invention would be used. Even though this invention has been disclosed as being used in NASA's Lunar Landing Research Facility, it could obviously be used other places. For example, it could be used in any overhead crane system.

I claim:

1. A safety system that limits the velocity of a vehicle with the limiting velocity being dependent on the position of the vehicle comprising:

a reversible motor mechanically connected to said vehicle for moving it in either of two opposite directions;

a generator mechanically connected to said motor for generating a voltage whose amplitude is proportional to the velocity of said vehicle and whose polarity is indicative of which of said two directions said vehicle is moving;

a potentiometer having its slider mechanically connected to said motor such that the movement of said slider corresponds to the movement of said vehicle;

a first switching diode with its anode connected to one side of said potentiometer;

a second switching diode with its cathode connected to the other side of said potentiometer and with its anode connected to the cathode of said first switching diode;

a relay which actuates its contacts when the current through its coil exceeds some predetermined value connected in series with said generator between said slider and the junction between said first and second diodes; and a controller for cutting off said motor when the contacts of said relay are actuated whereby the limiting velocity of said vehicle is dependent on both the velocity and position of said vehicle.

2. A safety system according to claim 1 including a first resistor connected between said one side of said potentiometer and the anode of said first switching diode and a second resistor connected between said other side of said potentiometer and the cathode of said second switching diode to insure that the velocity of said vehicle has to be above some minimum value before the contacts of said relay will be actuated.

3. A safety system according to claim 1 including a first Zener diode connected between the anode of said first switching diode and the slider of said potentiometer and a second Zener diode connected between the slider of said potentiometer and the cathode of said second switching diode to insure that the velocity of said vehicle cannot be above some predetermined value regardless of the position of said vehicle.

4. A safety system that limits the velocity of a vehicle with the limiting velocity being dependent on the position of the vehicle comprising:

a motor mechanically connected to said vehicle for moving it in one direction;

a generator mechanically connected to said motor for generating a voltage proportional to the velocity of said vehicle;

a variable resistor mechanically connected to said motor to lower the resistance of said variable resistor as said vehicle moves;

a relay which actuates its contacts when the current through its coil exceeds some predetermined value;

a switching diode connected in series with said variable resistor and said relay across said generator; and a controller for cutting off said motor when the contacts and said relay are actuated whereby the limiting velocity of said vehicle is dependent on both the velocity and position of said vehicle.

5. A safety system according to claim 4 including a resistor connected in series with said diode, said variable resistor and said relay to insure that the velocity of said vehicle has to be above some minimum value before the contacts of said relay will be actuated.

6. A safety system according to claim 4 including a Zener diode connected across said variable resistor to insure that the velocity of said vehicle cannot be above same predetermined value regardless of the position of said vehicle.

7. A safety system according to claim 2 including a first Zener diode connected between the anode of said first switching diode and the slider of said potentiometer and a second Zener diode connected between the slider of said potentiometer and the cathode of said second switching diode to insure that the velocity of said vehicle cannot be above some predetermined value regardless of the position of said vehicle.

References Cited
UNITED STATES PATENTS

| | | | |
|---|---|---|---|
| 2,422,180 | 6/1947 | Broadbent | 318—272 |
| 2,442,001 | 5/1948 | Hanna et al. | 318—30 |
| 2,670,454 | 2/1954 | Wilson | 318—28 |
| 2,766,412 | 10/1956 | Stephenson | 318—28 |
| 3,174,710 | 3/1965 | Hoekstra | 244—76 |
| 3,376,486 | 4/1968 | Caputo | 318—257 |

ORIS L. RADER, Primary Examiner

K. L. CROSSON, Assistant Examiner

U.S. Cl. X.R.

317—13, 19; 318—18, 326, 466